(12) United States Patent
Gall et al.

(10) Patent No.: US 9,026,989 B2
(45) Date of Patent: May 5, 2015

(54) OBJECT EXTENSIONS USING ATTRIBUTES TO DECOUPLE BASE CLASSES FROM DERIVED CLASSES

(75) Inventors: Michael Gall, Copenhagen (DK); Michael Fruergaard Pontoppidan, Lynge (DK); Lars Dragheim Blaaberg, Karlslunde (DK); Arthur Greef, Burien, WA (US)

(73) Assignee: Microsoft Technology Licensing LLC, Redmond, WA (US)

(*) Notice: Subject to any disclaimer, the term of this patent is extended or adjusted under 35 U.S.C. 154(b) by 0 days.

(21) Appl. No.: 13/490,487

(22) Filed: Jun. 7, 2012

(65) Prior Publication Data

US 2013/0332898 A1    Dec. 12, 2013

(51) Int. Cl.
*G06F 9/44* (2006.01)

(52) U.S. Cl.
CPC .................................... *G06F 9/4428* (2013.01)

(58) Field of Classification Search
None
See application file for complete search history.

(56) References Cited

U.S. PATENT DOCUMENTS

| | | | |
|---|---|---|---|
| 5,790,861 A * | 8/1998 | Rose et al. ..................... | 717/145 |
| 5,878,430 A * | 3/1999 | Lafuse .................................. | 1/1 |
| 6,330,709 B1 * | 12/2001 | Johnson et al. ............... | 717/100 |
| 6,615,199 B1 * | 9/2003 | Bowman-Amuah ............ | 706/50 |
| 7,383,533 B2 * | 6/2008 | Hasha ............................ | 717/116 |
| 7,673,283 B2 * | 3/2010 | Gutz et al. ..................... | 717/104 |
| 7,873,958 B2 * | 1/2011 | Wiltamuth et al. ........... | 717/170 |
| 8,615,729 B2 * | 12/2013 | Cornell et al. ................ | 717/104 |
| 2002/0046395 A1 * | 4/2002 | Briggs .......................... | 717/116 |
| 2003/0051229 A1 * | 3/2003 | Boyle ........................... | 717/116 |
| 2003/0131347 A1 * | 7/2003 | Allison ......................... | 717/165 |
| 2005/0086581 A1 * | 4/2005 | Bass et al. ................. | 715/500.1 |
| 2005/0289457 A1 * | 12/2005 | Obasanjo et al. ............. | 715/513 |
| 2006/0026568 A1 * | 2/2006 | Wiltamuth et al. ........... | 717/122 |
| 2006/0085489 A1 * | 4/2006 | Tomic et al. .................. | 707/200 |
| 2007/0192682 A1 * | 8/2007 | Neil et al. ..................... | 715/513 |
| 2008/0222073 A1 * | 9/2008 | Seeger et al. ................... | 706/48 |
| 2012/0185450 A1 * | 7/2012 | Marmigere et al. .......... | 707/695 |
| 2013/0262685 A1 * | 10/2013 | Shelton et al. ................ | 709/226 |

OTHER PUBLICATIONS

Greef, Arthur Reginald., "The Microsoft Dynamics AX 2012 extension framework—Part 3", Retrieved at <<http://blogs.msdn.com/b/arthurgr/archive/2011/09/22/the-microsoft-dynamics-ax-2012-extension-framework-part-3.aspx>>, Sep. 22, 2011, pp. 2.

(Continued)

*Primary Examiner* — Don Wong
*Assistant Examiner* — Roberto E Luna
(74) *Attorney, Agent, or Firm* — Damon Reith; Aaron Hoff; Micky Minhas

(57) ABSTRACT

An object oriented application framework is provided in which base classes are decoupled from derived classes by using attributes. Relationships between derived classes and attributes can be generated, and derive classes can be statically or dynamically instantiated at run time. By decoupling the base class from derived classes using instances of such attributes, a developer does not modify computer program code defining the base class when adding customized extensions to that base class. The framework includes a class factory that uses instances of attributes associated with elements to derive, at run time, extension classes. The attributes can be specified at run time to specify or to alter the run time behavior of the application. This framework also allows the application to conditionally instantiate an element based on its attributes.

20 Claims, 4 Drawing Sheets

(56) References Cited

OTHER PUBLICATIONS

Greef, Arthur Reginald., "The Microsoft Dynamics AX 2012 extension framework—Part 2", Retrieved at <<http://blogs.msdn.com/b/arthurgr/archive/2011/09/13/the-microsoft-dynamics-ax-2012-extension-framework-part-2.aspx>>, Sep. 13, 2011, pp. 2.

Raj, Gopalan Suresh., "The Factory Method (Creational) Design Pattern", Retrieved at <<http://gsraj.tripod.com/design/creational/factory/factory.html>>, Retrieved Date: Jan. 11, 2012, pp. 9.

Joe., "Decorator Pattern", Retrieved at <<http://javapapers.com/design-patterns/decorator-pattern/>>, May 17, 2011, pp. 9.

"Method hooks for extending JiBX", Retrieved at <<http://jibx.sourceforge.net/tutorial/binding-extend.html#extmeths>>, Retrieved Date: Jan. 11, 2012, pp. 5.

Kovacs, Romi., "Design Patterns: Create Dynamic Factories in .NET with Reflection", Retrieved at <<http://msdn.microsoft.com/en-us/magazine/cc164170.aspx>>, Mar. 2003, pp. 8.

* cited by examiner

OBJECT EXTENSIONS USING ATTRIBUTES TO DECOUPLE BASE CLASSES FROM DERIVED CLASSES

BACKGROUND

In object oriented programming environments, it can be challenging to extend object class definitions to modify a program or create new programs. While techniques exist for specifying how to generate derived object classes from base object classes, such techniques typically involve programming in which the base classes are tightly coupled to the derived classes.

Such tight coupling inhibits the development and maintenance of program libraries because each time a base library class is extended by an external application, the base library class is modified as well.

SUMMARY

This Summary is provided to introduce a selection of concepts in a simplified form that are further described below in the Detailed Description. This Summary is neither intended to identify key features or essential features of the claimed subject matter, nor intended to be used to limit the scope of the claimed subject matter.

An application framework is provided in which elements, such as base object classes, are decoupled from their extensions, such as derived classes, by using attributes. In particular, an extension is defined by associating an element with an instance of an attribute. Relationships between derived classes and attribute instances can be specified by a programmer, and derived classes can be statically or dynamically instantiated at run time. By decoupling the base class from derived classes using instances of such attributes, a developer does not modify computer program code defining the base class when adding customized extensions to that base class.

The application framework includes a class factory that uses instances of attributes associated with elements to derive extensions at run time. In other words, given one or more attributes and a set of elements associated with attributes, the class factory instantiates the derived classes for the set of elements based on the given attributes. The attributes can be specified at run time to specify or to alter the run time behavior of the application. This framework also allows the application to conditionally instantiate an element based on its attributes.

Extension data is stored in a searchable manner, such as a common repository or other construct that enables elements that have a given attribute to be identified. In particular, every element can be associated with one or more attributes. Elements themselves can be used as attributes. The association between an element and an attribute is called an extension. Data defining the extension (the element and attribute pair) is stored in a searchable repository such as an object cache in a run time environment or a database. Given an attribute or element, the repository is searched to identify relevant element/attribute pairs.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which such an application framework can be implemented.

Figure 1:
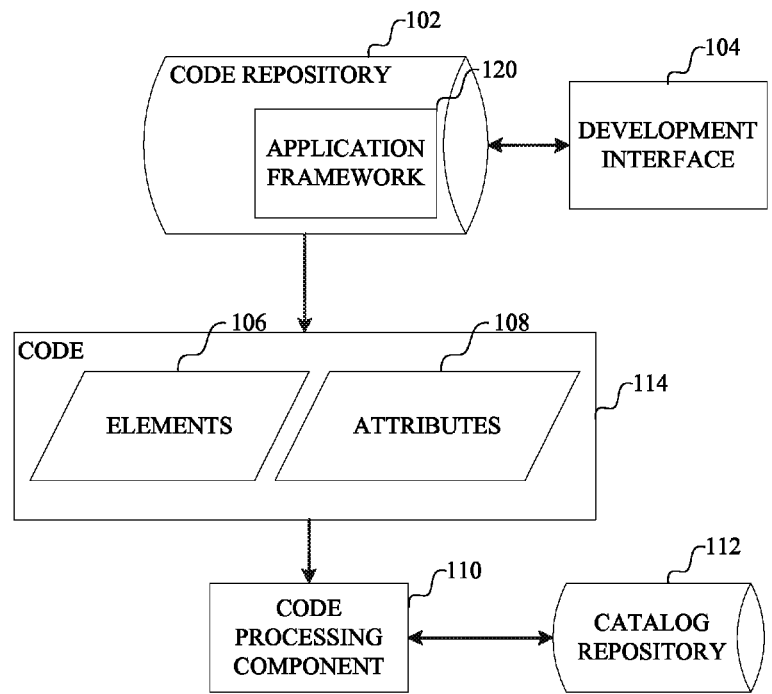
FIG. 1 is a block diagram of a computer system supporting an application framework that supports extensions.

Referring to FIG. 1, development system 100 includes a code repository 102 in which computer program code is stored. This code repository includes code for basic elements of the application framework 120 that can be extended by a programmer to implement programs that take advantage of the application framework. A development interface 104 is accessed by a developer to write computer program code that is stored in the code repository 102. Code in the code repository can be understood as a set of elements 106, such as object specifications in an object oriented computer program, or other elements such as modules, classes, properties, types, methods and the like. Each element has the capability of being associated with one or more attributes 108. A developer provides inputs to the development interface 104 to create elements and associate attribute instances with those elements. Example code from such interaction is described in more detail below.

In one implementation, an attribute is an object that has a list of properties. This list of properties can be obtained by transforming any other object or objects into one or more values for one or more properties of the attribute. For example, a base enumeration is an element with some concrete values. An attribute can be created that has one property that is a string value. A value from the enumeration can be used as an attribute instance. In this manner, an attribute can be any data, including an element.

A code processing component 110 processes the computer program code 114 including elements 106 and attributes 108. The code processing component maintains a catalog repository 112 of the associations between elements and attribute instances. The code processing component also executes the applications defined by the computer program code, providing a run time environment.

Given this context, an example implementation of the code processing component will be described in more detail in connection with FIGS. 2-4.

Figure 2:
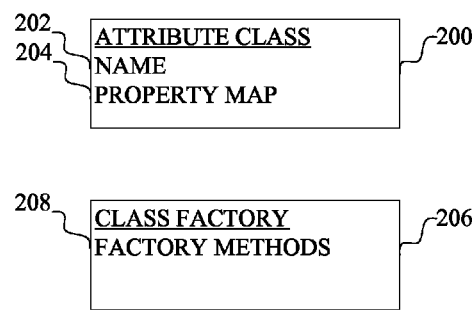
FIG. 2 is a class diagram illustrating an example implementation of the application framework supporting static extensions.

In FIG. 2, an implementation that supports a static class factory method is described. In this implementation, winch is described in the context of an object oriented system, the application framework includes an attribute class 200. When a developer defines an attribute to be used as an extension of an element, that attribute is defined as an extension to the attribute class. An extension of the attribute class has a name 202 and a property map 204.

The application framework also includes a class factory object 206. The class factory can have one or more methods that can be invoked to instantiate an extension of a base class. In particular, when a developer defines an extension to a base class using an attribute, the factory method for that base class includes a call to the class factor methods, with the attribute instance for the extension as a parameter. The class factory object 206, through its methods 208, accesses the catalog repository 112 to identify the classes that are derived from the base class that match the given attribute instance to instantiate the derived class.

Turning to Tables I-III, example code for defining an attribute for an extension, defining different extensions, and defining a factory method, as would be created by a developer, will now be described. In Table I below, a new attribute is created for an extension to a base class called "XCalculation". The attribute is called "XCalcFormula", and the class that defines this attribute to extend "XCalculation" is "XCalculationAttribute." This class extends the attribute class (e.g. 200 in FIG. 2), herein called "SysAttribute."

TABLE I

```
class XCalculationAttribute extends SysAttribute
{
    XCalcFormula formula;
    public void new(XCalcFormula _formula)
        {
            super( );
            formula = _formula;
        }
    public XCalcFormula parmFormula(XCalcFormula _formula =
    formula)
        {
            formula = _formula;
            return formula;
        }
}
```

In this example, the methods of "new" and "parmFormula" can be used to instantiate, set and retrieve the values of the XCalcFormula attribute.

The instances of this attribute then can be used to define different extensions of the base class XCalculation. Thus, XCalculation_Formula0 is the extension of the XCalculation class when the XCalcFormula attribute is set to Formula0.

TABLE II

```
class XCalculation{ }
    [XCalculationAttribute(XCalcFormula::Formula0)]
    class XCalculation_Formula0 extends XCalculation { }
    [XCalculationAttribute(XCalcFormula::Formula1)]
    class XCalculation_Formula1 extends XCalculation { }
```

If a developer desires to create another extension of the XCalculation class using a different formula (e.g., Formula2), then this base class definition is modified and no other changes are required.

TABLE III

```
class XCalculation
{
    client server static XCalculation construct(
        XCalcFormula formula, XCalcData calcData)
        {
    XCalculationAttribute extensionAttribute = new XCalculationAttribute (formula);
return SysExtensionAppClassFactory::getClassFromSysAttribute(classStr(XCalculation),
extensionAttribute);
        }
}
```

The base class XCalculation also includes a "construct" factory method to instantiate a derived class, which takes the attribute XCalcFormula as a parameter. Using this parameter, the "construct" factory method instantiates an XCalculationAttribute object, which in turn is used by the SysExtensionAppClassFactory object (the class factory) to find the class that is extended from the base class XCalculation.

Figure 3:
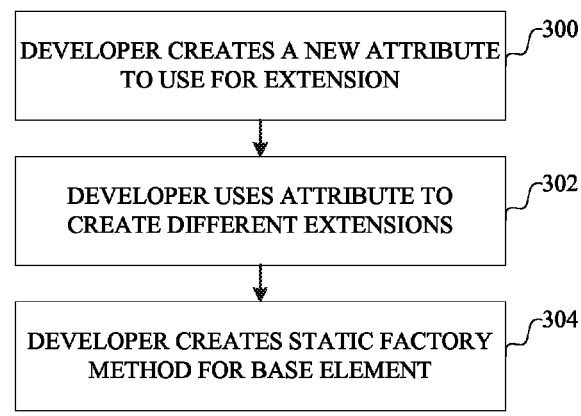
FIG. 3 is a flowchart describing how a developer creates a computer program with extensions.

In FIG. 3, a flowchart of the process of creating a derived class from a base class using this application framework will now be described. In FIG. 3, a developer begins by creating 300 a new attribute to use for the extension, thus creating code such as shown in Table I. The developer then uses the attribute to create 302 different extensions of the base class, thus creating code such as shown in Table II. Finally the developer creates 304 a factory method for the base class that uses a static factory class method and the attribute to retrieve a particular class instance, thus creating code such as shown in Table III.

Figure 4:
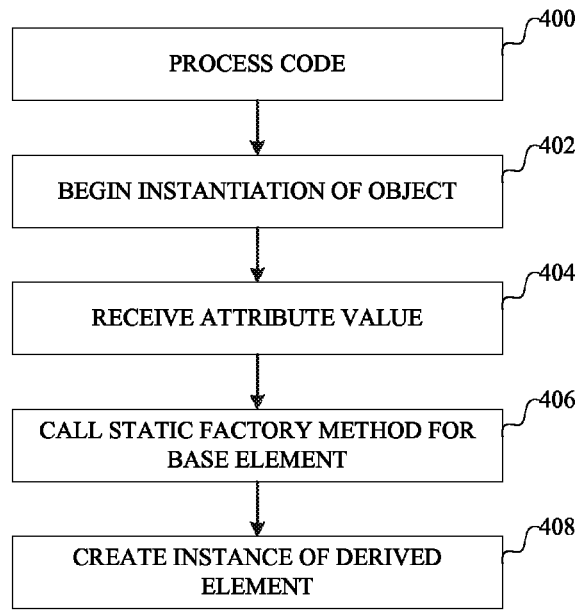
FIG. 4 is a flowchart describing how static extensions can be created.

FIG. 4 shows a flowchart describing the instantiation of a class extended from a base class using the defined extension at ran time. Given the code as written by the developer, an application program is instantiated by processing 400 (e.g., compiling or interpreting) the code and loading the application program. When the application program is loaded, die catalog repository (e.g., 112 in FIG. 1) is generated from the definitions of any attributes that have been defined, their possible instances, and the elements with which they are associated. Each relationship of an attribute instance with an element defines an extension of that element.

When an object is to be instantiated 402 (by a call to its static factory method), a value for the attribute is provided 404. A variety of ways can be used to provide the value of the attribute. The static factory method is called 406 with the provided value for the attribute. An instance of the object of the corresponding derived class is then created 408. This instance is created by searching the catalog repository for the given attribute instance to identify the corresponding extension of the element, and instantiating that extension of the element. This process can repeat several times for different elements throughout the run time of the application program.

The foregoing example illustrates a framework that permits static extensions of base classes. To implement a dynamic extension, additional structure is provided in the framework to be used by the developer in creating programs.

Figure 5:
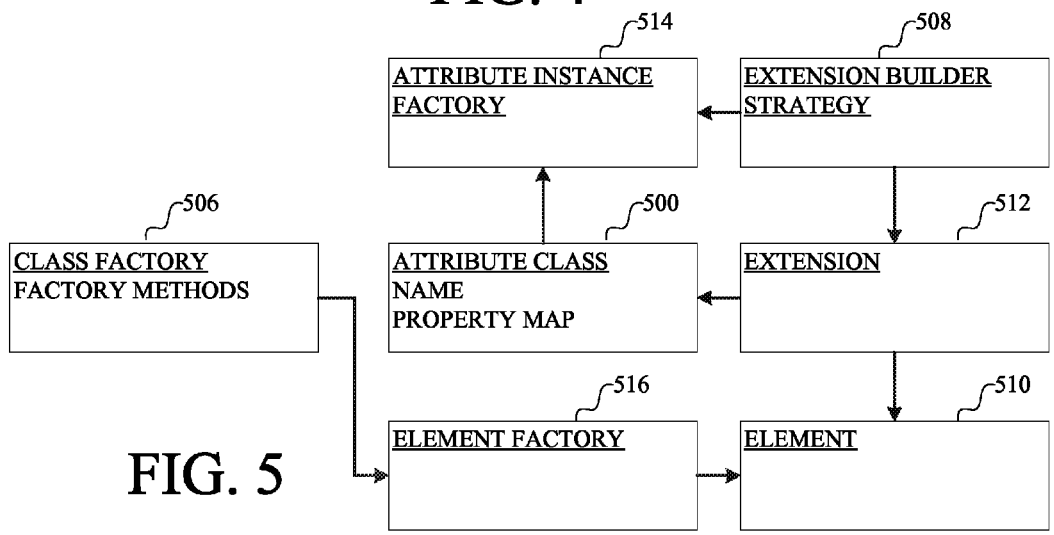
FIG. 5 is a class diagram illustrating an example implementation of the application framework supporting dynamic extensions.

Referring to FIG. 5, in one implementation, which is described in the context of an object oriented system, the application framework includes an attribute class 500. When a developer defines an attribute to be used as an extension of an element, that attribute is defined as an extension to the attribute class. An extension of the attribute class has a name and a property map.

The application framework also includes a class factory object 506. The class factory can have one or more methods that can be invoked to instantiate an extension of a base class. In particular, when a developer defines an extension to an element, such as a base class, the factory method for that element includes a call to the class factory method, with the element, and the name of the extended element, as a parameter. The class factory object 506, through its methods, accesses the catalog repository 112 to identify the classes that are derived from the base class that match the given element to instantiate the derived class. Various search strategies can be implemented to search the catalog repository for extensions, i.e., elements that are associated with attribute instances.

While the foregoing is similar to the framework supporting a static class factory, the following additional structure supports dynamic extensions. For example, an object called an extension builder strategy 508 is defined in the framework. A dynamic extension of a base class is supported by first defining an extension of this extension builder strategy object for the base class, with a method called that dynamically builds the extension. For example, for the class XCalculation described above, a class called XCalculationExtensionBuilder that extends the extension builder strategy object is defined, with a method called "build( )".

The framework in this implementation also includes an element 510, an extension 512, an attribute instance factory 514, and an element factory 516. Because an extension is a pair of an element and an instance of attribute that decorates that element, to create a dynamic extension, the framework provides objects to create elements and attribute instances (the attribute instance factory and the element factory). An extension is then added by associating the created element and attribute instances and storing their relationships in the catalog repository. Each of the created objects (element and attribute instance) can be stored in an object cache, and their cache keys can be stored as part of the stored relationship in the catalog repository.

Turning to Tables IV-V, example code for defining dynamic extensions, as would be created by a developer, will now be described. In Table IV below, a new extension builder class is created which extends a base extension builder class (e.g., 508 in FIG. 5, herein called "SysExtensionBuilderStrategy". The new extension builder is called "XCalculationExtensionBuilder." This extension builder has a "build" method that creates an element (derived from the base class), and an attribute that decorates that element, and stores an extension in the repository that relates the cache keys of the pair.

TABLE IV

```
class XCalculationExtensionBuilder extends SysExtensionBuilderStrategy
{
    public void build( )
    {
        SysExtModelElement element;
        element =
        SysExtModelElementAppFactory::newFromEnum(enumNum(XCalcFormula), XCalcFormula::
        Formula0);
        SysExtension::addExtension(SysExtModelElementAppFactory::newFromClassName(class
        Str(XCalculation)).parmCachekey( ),
        SysExtModelAttributeInstanceFactory::newFromElement(element).parmCacheKey( ));
    }
}
```

Then, the base class is defined with a construct( ) factory method that creates a new element from an enumeration that specifies the new attribute, and returns an instance of that new class.

TABLE V

```
class XCalculation
{
    client server static XCalculation construct(XCalcFormula formula, XCalcData
    calcData)
    {
    SysExtModelElementApp element =
    SysExtModelElementAppFactory::newFromEnum(XCalcFormula), formula);
    return SysExtensionAppClassFactory::getClassFromElement(clsssstr(XCalculation),
    element);
    }
}
```

The base class XCalculation also includes a "construct" factory method to instantiate a derived class, which takes the attribute XCalcFormula as a parameter. Using this parameter, the "construct" factory method instantiates a new element, which is turn is used by the SysExtensionAppClassFactory object (the class factory) to find and instantiate the class that extends from the base class XCalculation.

Given a framework of base elements such as described in FIGS. 2 and 5, a programmer can create an application program that uses such base elements when defining other elements, for example, base classes. Extensions to such elements, such as derived classes, are obtained by decorating the base class with an attribute, with the derived classes being associated with instances of the attribute.

The factory method of an element can use any search strategy desired by the programmer to identify extensions of the element, and any instantiation strategy desired by the programmer to instantiate the extension. Regarding search strategies, for example, the catalog repository can be searched, given an element, for all of the extensions available for the element, from which one is selected. As another example, the catalog repository can be searched, given an attribute instance, for all of the elements that are extended using that attribute instance.

If the application program is a library, further extensions to the library can be defined without having to modify and recompile the library. The extensions to the library can be compiled and used independently. Further, the various components (application framework, library and extensions to the library) can be stored in different locations, so long as they are accessible by the run time environment.

An extension also can be modified at run time by changing the attribute instances associated with the element in the catalog repository.

Figure 6:
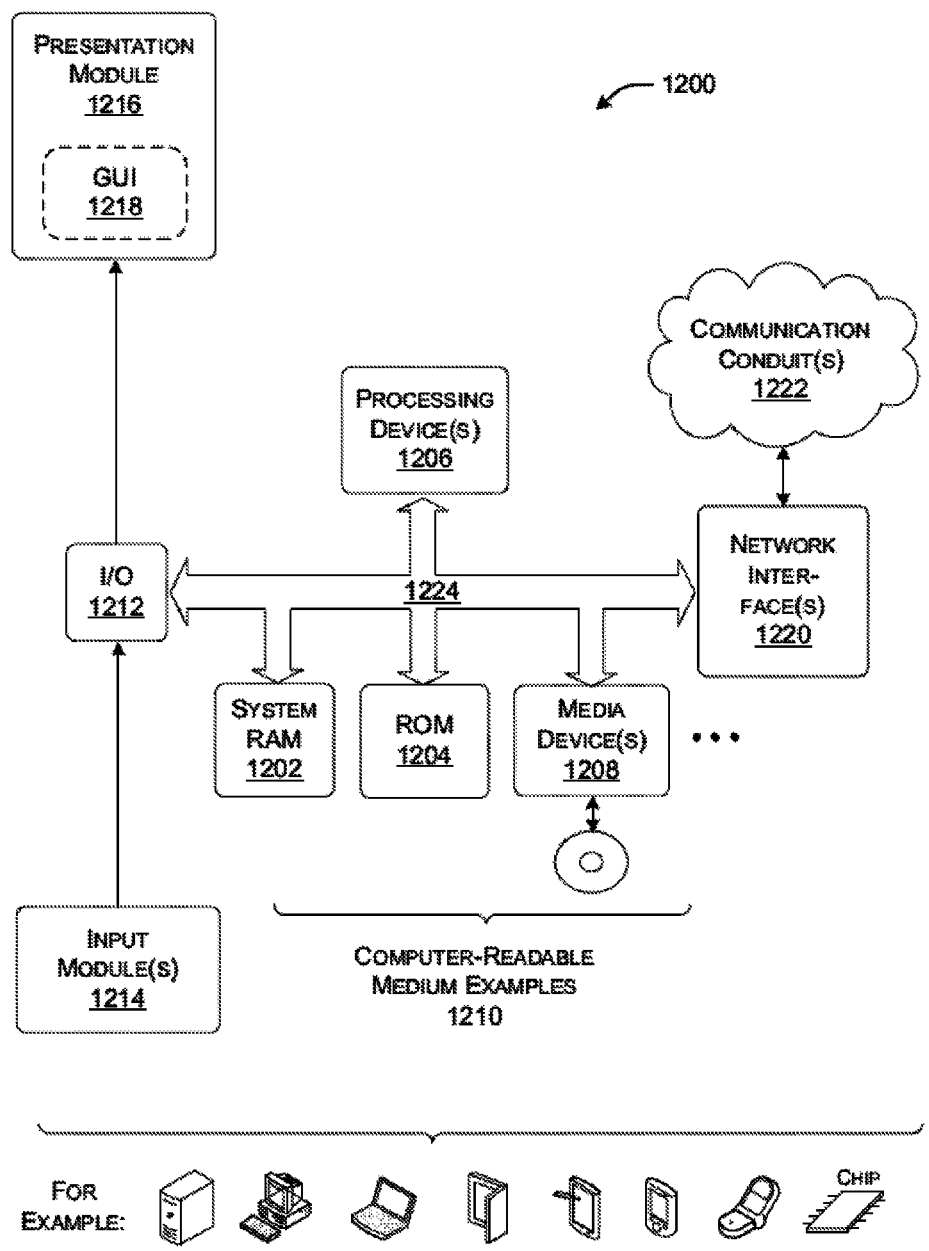
FIG. 6 is a block diagram of an example computing device in which such a system can be implemented.

FIG. 6 sets forth illustrative computing functionality 1200 that can be used to implement any aspect of the functions described above. For example, the computing functionality 1200 can be used to implement any aspect of the developer interface module 104, code repository, or code processing component of FIG. 1. Such modules in FIG. 1 can be implemented on one or more computing functionalities, and in some cases a distributed system can have each module reside on its own computing functionality. In the deployment of an application program or library, an application framework, library and program using the library can utilize one or more computing functionalities as well. In all cases, the computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more central processing units (CPUs), and/or one or more graphical processing units (GPUs), and/or other coprocessors, etc.). The computing functionality 1200 also optionally includes various media devices 1208, such as a hard disk module, an optical disk module, and so forth. The computing functionality 1200 can perform various operations, and manage data in memory, as identified above when the processing device(s) 1206 processes (e.g., executes or interprets) instructions that are maintained by memory (e.g., random access memory (RAM) 1202, whether static or dynamic, read-only memory (ROM) 1204, whether erasable or not, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In all cases, the computer readable medium 1210 represents some form of physical and tangible entity.

The computing functionality 1200 also includes an input/output module 1212 for receiving various inputs (via input modules 1214), and for providing various outputs (via output modules). Input module 1214 may utilize various input device(s) such as a keyboard, mouse, pen, camera, touch input device, and so on. Other input devices that support natural user interfaces also can be used. A natural user interface is any interface technology that enables a user to interact with a device in a "natural" manner, free from artificial constraints imposed by other mechanical input devices. Examples of natural user interfaces include, but are not limited to, speech recognition, touch and stylus recognition, gesture recognition both on screen and adjacent to the screen, air gestures, head and eye tracking, voice and speech, vision, touch, gestures, and machine intelligence. Various input devices, such as sensors, are used to support such natural user interfaces. Output modules may utilize various output device(s) such as a display, speakers, a printer, and so on. One particular output mechanism may include a presentation module 1216 and an associated graphical user interface (GUI) 1218.

The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), etc, or any combination thereof. The communication conduit(s) 1222 can include any combination of hardwired links, wireless links, routers, gateway functionality, name servers, etc., governed by any protocol or combination of protocols.

The computing functionality can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer implemented process supporting an application framework, comprising:
   receiving computer program code into memory defining:
      an element defining a base class;
      an attribute having one or more instances;
      wherein the element includes an extension definition defining a derived class for the base class as an extension of the element using an instance of the attribute, the extension definition associating the extension of the element with the instance of the attribute; and
      an element factory having a method for the element that, given the extension definition of the element and an instance of the attribute, generates an instance of the extension of the element according to the instance of the attribute associated with the extension of the element by the extension definition;
   processing the computer program code with a processor to instantiate the extension of the element including:
      receiving a value for the attribute, and
      executing the method of the element factory for the element that instantiates the extension using the received value for the attribute; and
   enabling the computer program code to be altered on a computer to add an extension to the element by adding an instance of the attribute to the computer program code.

2. The application framework of claim 1, wherein the element factory provides static extensions.

3. The application framework of claim 2, wherein an attribute for an element is defined as an extension of an attribute class.

4. The application framework of claim 3, wherein a base class for the element includes a static factory method that uses a value of the attribute instance to instantiate an extension of the base class.

5. The application framework of claim 1, wherein the element factory provides dynamic extensions.

6. The application framework of claim 5, wherein the framework includes an extension builder for an element, the extension builder creating an instance of an attribute factory and an instance of the element factory and relating them as an extension.

7. The application framework of claim 6, wherein the attribute is defined as an extension of an attribute class.

8. The application framework of claim 7, wherein a base class for the element includes a method that uses the attribute factory and the element factory to create an instance of the derived class.

9. An article of manufacture comprising: a computer storage medium comprising at least one of a memory device and a storage device; computer program instructions stored on the computer storage medium comprising: an element defining a base class; an attribute having one or more instances; wherein the element includes an extension definition defining a derived class of the base class as an extension of the element using an instance of the attribute, the extension definition associating the extension of the element with the instance of the attribute; and an element factory having a method for the element that, given the extension definition of the element, generates an instance of an extension of the element according to the instance of the attribute associated with the extension of the element by the extension definition; and wherein, when the computer program instructions are processed by a processing device, the computer program instructions instruct the processing device to to instantiate the extension of the element including: receiving a value for the attribute, and executing the method of the element factory that instantiates the extension using the received value for the attribute; and wherein the computer program instructions can be altered to add an extension to the element by adding an instance of the attribute to the computer program instructions.

10. The article of manufacture of claim 9, wherein the element factory provides static extensions.

11. The article of manufacture of claim 10, wherein an attribute for an element is defined as an extension of an attribute class.

12. The article of manufacture of claim 11, wherein a base class for the element includes a static factory method that uses a value of the attribute instance to instantiate an extension of the base class.

13. The article of manufacture of claim 9, wherein the element factory provides dynamic extensions.

14. The article of manufacture of claim 13, wherein the framework includes an extension builder for an element, the extension builder creating an instance of an attribute factory and an instance of the element factory and relating them as an extension.

15. The article of manufacture of claim 14, wherein the attribute is defined as an extension of an attribute class.

16. A computing machine comprising: a computer storage medium, comprising at least one of a memory device and a storage device; a processing device; computer program instructions stored on the computer storage medium comprising: an element defining a base class; an attribute having one or more instances; wherein the element includes an extension definition defining a derived class for the base class as an extension of the element using an instance of the attribute, the extension definition associating the extension of the element with the instance of the attribute; and an element factory having a method for the element that, given the extension definition of the element, generates an instance of an extension of the element according to the instance of the attribute associated with the extension of the element by the extension definition; and wherein, when the computer program instructions are processed by a processing device, the computer program instructions instruct the processing device to instantiate the extension of the element including: receiving a value for the attribute, and executing the method of the element factory that instantiates the extension using the received value for the attribute; and wherein the computer program instructions can be altered to add an extension to the element by adding an instance of the attribute to the computer program instructions.

17. The computing machine of claim 16, wherein the element factory provides static extensions.

18. The computing machine of claim 17, wherein an attribute for an element is defined as an extension of an attribute class.

19. The computing machine of claim 18, wherein a base class for the element includes a static factory method that uses a value of the attribute instance to instantiate an extension of the base class.

20. The computing machine of claim 16, wherein the element factory provides dynamic extensions.

* * * * *